United States Patent [19]

Shefford

[11] 4,371,574
[45] Feb. 1, 1983

[54] ENCLOSURE MEMBER SUBSTANTIALLY IMPERMEABLE TO THE TRANSMISSION OF SOLVENTS AND FUELS

[75] Inventor: Roger A. Shefford, Aldershot, Great Britain

[73] Assignee: Koninklijke Emballage Industrie Van Leer B.V., Amstelveen, Netherlands

[21] Appl. No.: 213,668

[22] Filed: Dec. 5, 1980

[30] Foreign Application Priority Data

Feb. 12, 1980 [GB] United Kingdom ............... 8004570

[51] Int. Cl.³ .................... B65D 23/00; B05D 3/00
[52] U.S. Cl. .................................. 428/35; 428/339; 428/516; 428/520; 215/1 C; 215/12 R; 427/299
[58] Field of Search ............. 428/35, 502, 516, 339, 428/520

[56] References Cited

U.S. PATENT DOCUMENTS

| 2,400,720 | 5/1946 | Staudinger . | |
|---|---|---|---|
| 2,786,780 | 3/1957 | Walles et al. | 428/516 |
| 2,786,783 | 3/1957 | Hahn et al. . | |
| 2,832,697 | 4/1958 | Walles . | |
| 2,832,698 | 4/1958 | Walles . | |
| 2,832,699 | 4/1958 | Walles . | |
| 2,860,801 | 11/1958 | Nielsen . | |
| 2,937,066 | 5/1960 | Walles . | |
| 2,985,542 | 5/1961 | Pinsky et al. . | |
| 3,294,577 | 12/1966 | Mayer . | |

FOREIGN PATENT DOCUMENTS

| 44-20236 | 9/1969 | Japan | 428/516 |
|---|---|---|---|
| 45-36439 | 11/1970 | Japan | 428/502 |

Primary Examiner—P. Ives
Attorney, Agent, or Firm—Brumbaugh, Graves, Donohue & Raymond

[57] ABSTRACT

The present application relates to enclosure members consisting essentially of solid, non-aromatic polymers that have a linear carbon to carbon backbone structure and having a plurality of free hydrogen atoms attached to the carbon atoms with a permeability to wet solvents and fuels of less than 1/50, optionally less than 1/200 of the permeability of untreated enclosure members having a thickness of 1 mm. Said low permeability is due to the presence of a coating on at least the inner surface of said enclosure members, having a portion of the hydrogen atoms replaced by sulphonic acid or sulphonate groups, consisting of a cured thin layer (of at least 2 µm) of condensation products of formaldehyde and melamine of formaldehyde and urea. Evidently the application relates also to a method of preparing said enclosure members.

5 Claims, 1 Drawing Figure

WEIGHT LOSS OF WET XYLENE FROM SULPHONATED BOTTLES (SURFACES NEUTRALISED AND TREATED WITH CATALISED RESIN)

WEIGHT LOSS OF WET XYLENE FROM SULPHONATED BOTTLES
(SURFACES NEUTRALISED AND TREATED WITH CATALISED RESIN)
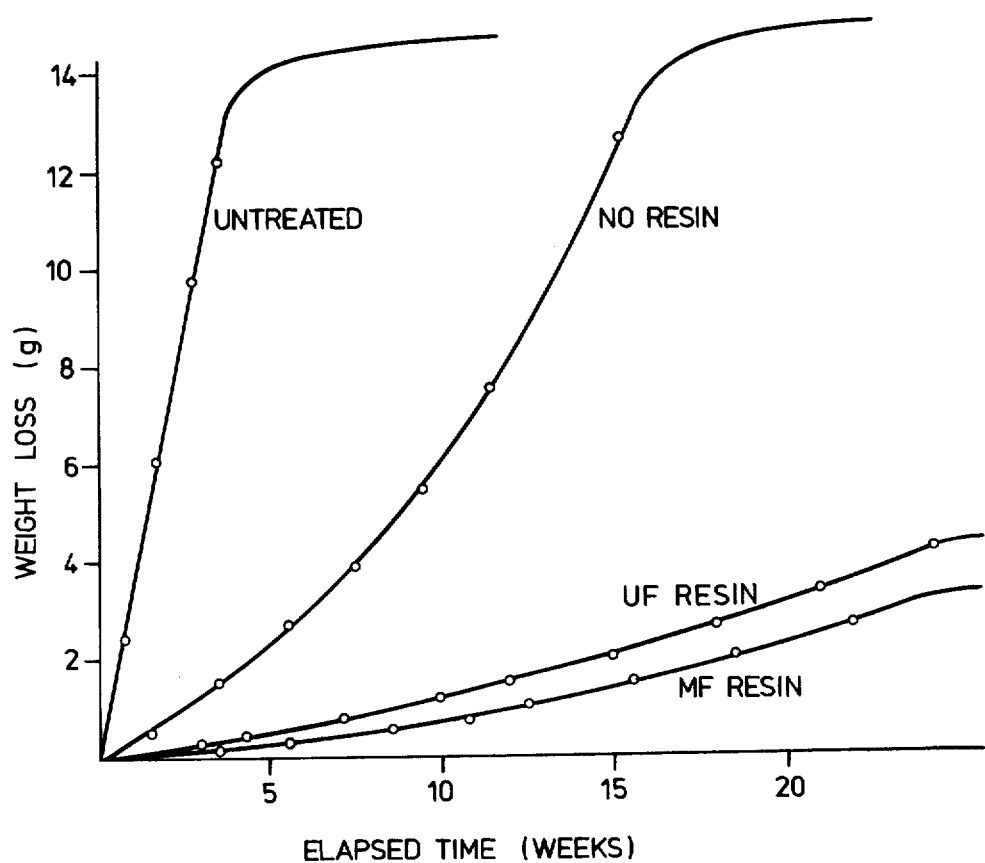

ENCLOSURE MEMBER SUBSTANTIALLY IMPERMEABLE TO THE TRANSMISSION OF SOLVENTS AND FUELS

The present invention relates to an enclosure member substantially impermeable to the transmission of solvents and fuels consisting essentially of solid, non-aromatic polymers that have a linear carbon to carbon backbone structure and have a plurality of free hydrogen atoms attached to the carbon atoms, the enclosure having an inner and outer surface, at least the inner surface having a portion of the hydrogen atoms replaced by sulphonic acid groups and a process for preparing it.

Generally the above type of enclosure members have excellent properties, being light in weight, strong, resistant to impact and unaffected by a wide range of chemicals. However, polyethylene, for example, has inherently a high permeability to many organic solvents, particularly hydrocarbons and chlorinated hydrocarbons. This has prevented them from being used extensively in, for example, petrol tanks for vehicles or shipping containers where these solvents are present in the product to be packed.

Several methods of reducing said permeability are known and one of the most successful of these is to sulphonate the surface of the container by treatment with sulphur trioxide and neutralise the sulphonic acids formed on the polyethylene surface. (Vide U.S. Pat. Nos. 2,793,964, 3,613,957 and 3,740,258).

Apart from that, in U.S. Pat. No. 2,786,780 it is suggested to provide effective barriers against the transmission or permeation of certain gases and vapors, particularly oxygen, by applying a tightly adhering and firmly anchored coating of a resinous tripolymer of vinylidene chloride, acrylonitrile and a functionally acidic ethenoid monomer, wherein the surface of the polyethylene article to be protected is subjected to a three step method i.e. sulphonating it in the usual way, treating said sulphonated surface with a polybasic compound containing at least 2 amine groups and subsequently applying a layer of the functionally acidic resinous tripolymer over the amine treated sulphonated surface.

Although the permeability for dry solvents is much reduced by means of sulphonation it has been found that a sulphonated surface will loose the barrier properties achieved, if it is in contact with a solvent that contains a significant proportion of water for a period of some days. If such a sulphonated polyethylene surface is in contact with a wet solvent for some weeks the permeability may rise to an unacceptable level.

The effect of water in various solvents on the permeability of sulphonated polyethylene is shown in Table A. Solvents which permeate at a faster rate appear to be affected by water to a greater extent.

TABLE A

The effect of water in different solvents on the permeability of sulphonated polyethylene bottles after 6 weeks storage at 20° C.

| | Permeability (g mm/m$^2$/day) | |
|---|---|---|
| | sulphonated | untreated |
| xylene | 0.6 | 20 |
| xylene + 1% water | 5.0 | 20 |
| petrol | 0.9 | 28 |
| petrol + 1% water | 3.0 | 28 |
| iso octane | 0.1 | 1.4 |
| iso octane + 1% water | 0.1 | 1.4 |

TABLE A-continued

The effect of water in different solvents on the permeability of sulphonated polyethylene bottles after 6 weeks storage at 20° C.

| | Permeability (g mm/m$^2$/day) | |
|---|---|---|
| | sulphonated | untreated |
| petroleum ether | 0.3 | 11 |
| petroleum ether + 1% water | 0.6 | 11 |

In order to lower the gasoline permeability of sulphonated polyethylene vessels for hydrated gasoline to 1/6–1/20 of the permeability of untreated vessels, it is suggested in Japan patent application No. 125476, now Japan patent specification No. 55-55938 to coat the sulphonated surface of such a vessel with an epoxy resin layer, e.g. an epoxy resin prepared from bisphenol A and epichlorohydrin.

It has been further found that actinic radiation, i.e. sunlight, affects the colour of sulphonated polyethylene. This explains why sulphonated polyethylene surfaces are affected by light when it is subjected to daylight behind a glass window. Contact of a sulphonated polyethylene surface in daylight with water promotes synergistically a deterioration of said sulphonated polyethylene surface. Probably such a surface is degraded by either water and/or light and residues absorbed by the liquid.

The de-colouration of sulphonated polyethylene by daylight may be eliminated by using a polyethylene that contains a black pigment and/or dye stuff. When exposed to daylight black polyethylene is less sensitive to the above effect than a natural polyethylene, as can be seen from Table B which relates the effect to increases, and therefore deterioration, in permeability properties.

TABLE B

Permeability of sulphonated polyethylene bottles to xylene-the effect of water in the xylene and daylight after 6 weeks storage at 20° C.

| Treatment | Situation | Colour of bottle | Permeability (g mm/m$^2$/day) | |
|---|---|---|---|---|
| | | | xylene | xylene + 1% H$_2$O |
| Sulphonated | Daylight | Natural | 0.6 | 9.8 |
| | | Black | 0.3 | 4.1 |
| Sulphonated | Dark | Natural | 0.3 | 3.6 |
| | | Black | 0.4 | 3.7 |
| Untreated | Daylight | Natural | 17 | 17 |
| | | Black | 20 | 22 |

It has been observed that water or light separately reduce the concentration of sulphonate groups at the surface of a sulphonated polyethylene by about 30% in 15 weeks. Water and light together reduce the sulphur concentration to zero in that time.

Even when a sulphonated polyethylene surface is not in contact with liquid, the presence of a solvent vapour or water vapour in the atmosphere will reduce the concentration of sulphonate groups if the samples are in daylight. However, in the absence of light the concentration is not significantly changed, as appears from Table C.

TABLE C

Effect of sunlight and atmosphere on the sulphur concentration of sulphonated polyethylene.

| | Sulphur concentration ($g/m^2$) after 6 weeks storage at 20° C. | |
|---|---|---|
| | in daylight | in darkness |
| Dry air | 0.9 | 1.0 |
| Saturated water vapour | 0.2 | 0.8 |
| Saturated xylene vapour | 0.3 | 1.0 |

It was found now, that enclosure members consisting essentially of solid, non-aromatic polymers that have a linear carbon to carbon back/bone structure and having a plurality of free hydrogen atoms attached to the carbon atoms with a permeability to wet solvents and fuels of less than 1/50, optionally less than 1/200 of the permeability of untreated enclosure members having a thickness of 1 mm, may be obtained by coating at least the inner surface thereof having a portion of the hydrogen atoms replaced by sulphonic acid or sulphonate groups with a cured thin layer (of at least 2 μm) of condensation products of formaldehyde and melamine or formaldehyde and urea.

Suitable condensation products of formaldehyde and melamine or urea and formaldehyde can be prepared in such a way that they are substantially water soluble and the resins will cure at temperatures below the softening point of polyethylene. Satisfactory results can be obtained by allowing the resin to cure at ambient temperatures.

It can be seen from Table D that application of UF or MF resin on sulphonated polyethylene surfaces improves the impermeability for wet solvent to such a degree that the permeability of said surfaces to a wet solvent and to said solvent in an anhydrous condition is substantially identical. The UF and MF resin normally need an acidic catalyst for cure. In many cases the non-neutralised sulphonic acid surface is sufficiently acidic to promote said cure.

TABLE D

The effect of UF and MF resin on the permeabiltiy of sulphonated polyethylene bottles to wet xylene after 6 weeks storage

| | | Permeability ($g\ mm/m^2/day$) | |
|---|---|---|---|
| Catalyst | Neutralization | BIP Resin W 977 (Urea formaldehyde) supplied as a 50% solution catalyst is 10% of ammonium chloride solution 25% | Glasurit HH43-0102 (Melamine formaldehyde) supplied as a 70% solution catalyst is equal volume of toluene sulphonic acid solution 25% |
| None | None | 0.4 | 0.4 |
|  | NH$_4$OH | 0.3 | 1.8 |
|  | NH$_3$ | 0.3 | 1.4 |
| With Catalyst | None | 0.3 | 0.3 |
|  | NH$_4$OH | 0.5 | 0.6 |
|  | NH$_3$ | 0.3 | 0.6 |

From Table D it appears that neutralisation of the sulphonated surface before a UF resin is applied does not affect the permeability of the sulphonated polyethylene to a wet solvent. However, if an MF resin is used the lowest permeability is obtained in the absence of neutralisation particularly if no catalyst is used.

Optimum conditions of catalysis and cure vary from resin to resin. MF resins appear to be more critical in this respect than UF resins.

BRIEF DESCRIPTION OF THE DRAWING

The improvement with respect to weight loss of wet xylene from sulphonated bottles as such, after neutralisation, after treatment with a UF resin respectively after treatment with a MF resin is elucidated clearly by the FIGURE.

Very good results are achieved by application of furfuryl alcohol modified UF resins as is shown in Table E. The results achieved by application of said resin on a non-neutralised sulphonated polyethylene surface are better than the results achieved by application of said resins on neutralised sulphonated polyethylene surfaces. Thus omittance of the neutralisation step is preferred.

TABLE E

Examples of use of furfuryl alcohol modified UF resins (xylene used as test solvent)

| | | Permeability ($g\ mm/m^2/day$) | | |
|---|---|---|---|---|
| | | 1 | 2 | 3 |
| None | Dry | 0.1 | 0.1 | 0.1 |
|  | Wet | 0.1 | 0.1 | 0.1 |
| Ammonia gas | Dry | 0.9 | | 0.5 |
|  | Wet | 0.1 | | 0.4 |

1 = Resin 68-1 (from Van Leer (U.K.))
2 = Resin 68-3 (from Van Leer (U.K.))
3 = Resin TCS39 (from Bordon Chemicals (U.K.) Ltd.)

EXAMPLE 1

Polyethylene Samples

Bottles were blow moulded by BP Chemicals Ltd. from their Rigidex 00255.

Sulphonation

The bottles were dried by passing dry air or nitrogen (less than 2 ppm water) through the bottle. Dry air or nitrogen containing 15 volume % SO$_3$ was then passed into the bottle unit it had replaced the original air or nitrogen. After leaving the vapour in the bottle for 2 minutes it was removed by blowing dry air or nitrogen through the bottle for a few minutes. If neutralisation with ammonia gas was required this was then passed through the bottle, and blown out with air. Any remaining sulphur trioxide and/or ammonia was washed out with water. Where required neutralisation with 5% ammonium hydroxide was carried out at this stage, and the bottle washed again and allowed to dry at ambient temperature.

Post-treatment

Various alternative treatments were applied to the polyethylene samples after sulphonation as described below:

The bottle with or without neutralisation was filled with a solution of one of the organic lacquers listed below. After draining the excess lacquer the sample was cured as appropriate (usually for 1 hour at 80° C.).

The lacquers used were:

| | |
|---|---|
| Urea formaldehyde resin (UF) | |
| W 977 | BIP Ltd. |
| 900-2 | BIP Ltd. |
| 768-2 | BIP Ltd. |
| Beckurol VHP 4400 | Resinous Chemicals Ltd. |
| Melamine formaldehyde resins (MF) | |
| Glasurit HH43-0102 | Glasurit Beck Ltd. |
| 336-2 | BIP Ltd. |
| 789-2 | BIP Ltd. |
| Phenolic resin | |
| SG 30100 | Schenectady-Midland Ltd. |
| Furan resin | |
| AS62-6B + urea | Van Leer (U.K.) Ltd. |

Measurement of Permeability

The permeability of bottles was measured by filling with solvent and measuring the weight loss over e period of time.

Permeability of wet solvents was determined by adding 1 weight % water to the solvent and shaking thorougly. Preliminary experiments showed that the concentration of water was not critical providing the solvent was saturated.

TABLE F

Effect of alternative resins on the permeability of sulphonated HDPE bottles after 6 weeks storage

| | | Permeabiltiy (g mm/m²/day)* | | | |
|---|---|---|---|---|---|
| | | Neutralized with NH₃ | | Unneutralized | |
| Resin Grade | Resin Grade | Catalised | Uncat. | Catalised | Uncat. |
| Urea/ | BIP W977 | 0.3 | 0.3 | 0.3 | 0.4 |
| Formal- | BIP 900-2 | 0.2 | 0.6 | — | 1.3 |
| dehyde | BIP 768-2 | 1.3 | 0.6 | — | 0.7 |
| | Beckurol VHP 4400 | 0.7 | 1.6 | — | 0.4 |
| Melamine/ | Glasurit | | | | |
| Formal- | HH43-0102 | 0.8 | 2.1 | 0.3 | 0.4 |
| dehyde | BIP 336-2 | 0.7 | 0.8 | — | 0.6 |
| | BIP 798-2 | 6.1 | 5.6 | — | 6.3 |
| Furan | AS62-6B (NF2) | 0.4 | — | — | 0.1 |

*Wet xylene used as test solvent

EXAMPLE 2

A condensation product of melamine and formaldehyde was prepared by heating a solution of formaldehyde and adding a slurry of melamine in water. When the melamine had dissolved methanol was added to the solution and the reaction continued for a further hour and the pH adjusted to 9. The solution was diluted with water to give a final resin concentration of 25 weight %.

Several high density polyethylene bottles were sulphonated as described above. Some were neutralised with ammonia gas while others were not neutralised at all. In all cases the bottles were washed with water. They were then filled with resin, emptied after five minutes and placed in an oven at 80° C. for 1 hour.

The permeability of the bottles to dry xylene and wet xylene (containing 1% water) was determined at 20° C. with the results as shown in Table G.

TABLE G

| Neutralization of surface | Solvent | Permeability (g mm/m²/day) |
|---|---|---|
| None | Dry xylene | 0.2 |

TABLE G-continued

| Neutralization of surface | Solvent | Permeability (g mm/m²/day) |
|---|---|---|
| | Wet xylene | 0.2 |
| Ammonia gas | Dry xylene | 0.2 |
| | Wet xylene | 0.6 |

EXAMPLE 3

A condensation product of urea and formaldehyde was prepared by heating a solution containing urea and formaldehyde. Before the reaction was complete some furfuryl alcohol was added to the mixture and the reaction continued to completion. The resin solution formed was adjusted to a pH of 6.5 and diluted to give a final resin concentration of 25 weight %.

Several high density polyethylene bottles were sulphonated, coated with resin and tested as described in Example 2. The permeability to dry xylene and wet xylene (containing 1 weight % water) was determined at 20° C. The results are shown in Table H.

TABLE H

| Neutralization of surface | Solvent | Permeability (g mm/m²/day) |
|---|---|---|
| None | Dry xylene | 0.1 |
| | Wet xylene | 0.1 |
| Ammonia gas | Dry xylene | 0.9 |
| | Wet xylene | 0.1 |

EXAMPLE 4

An anionic urea-formaldehyde resin was prepared by reacting together urea and formaldehyde. When the reaction was partially complete some sodium bisulphite solution was added to the mixture and the reaction continued to completion. The solution ws diluted to give a final resin concentration of 25% by weight and a pH of 7.5.

Several high density polyethylene bottles were sulphonated and coated with this resin as described in Example 2. The permeability to dry xylene and wet xylene (containing 1% water) was determined at 20° C. The results are shown in Table I.

TABLE I

| Neutralization of surface | Solvent | Permeabiltiy (g mm/m²/day) |
|---|---|---|
| None | Dry xylene | 1.1 |
| | Wet xylene | 0.3 |
| Ammonia gas | Dry xylene | — |
| | Wet xylene | 0.4 |

EXAMPLE 5

A cationic urea-formaldehyde resin was prepared by reacting together urea and formaldehyde. When the reaction was partially complete some diethylene triamine was added to the mixture and the reaction continued. When the reaction was complete the pH was adjusted to 6.5, and the concentration of the solution adjusted to 45% by weight.

Bottles which had been sulphonated as previously described were coated with the resin and cured at 80° C. The permeability of the bottles was as shown in Table J.

TABLE J

| Neutralization of surface | Solvent | Permeability (g mm/m²/day) |
|---|---|---|
| None | Dry xylene | 0.3 |
| | Wet xylene | 0.4 |
| Ammonia gas | Dry xylene | 0.3 |
| | Wet xylene | 0.4 |

I claim:

1. An enclosure member consisting essentially of solid, non-aromatic polymers that have a linear carbon to carbon backbone structure and have a plurality of free hydrogen atoms attached to the carbon atoms with a permeability to wet solvents and fuels of less than 1/50 of the permeability of untreated enclosure members having a thickness of 1 mm, the enclosure having an inner and outer surface, at least the inner surface having a portion of the hydrogen atoms replaced by sulphonic acid or sulphonate groups and being coated with a cured layer having a thickness of from 2 to 50 micrometers of condensation products selected from the group consisting of formaldehyde and melamine or formaldehyde and urea.

2. An enclosure member according to claim 1, wherein said solid, non-aromatic polymer is polyethylene.

3. An enclosure member according to claim 1, wherein a layer bearing non-neutralized sulphonic acid groups is coated with a layer of condensation products selected from the group consisting of formaldehyde and melamine or formaldehyde and urea.

4. An enclosure member according to claims 1, 2 or 3 wherein said condensation product is a urea-formaldehyde-furfuryl alcohol resin.

5. An enclosure member according to claim 1, wherein said permeability is less than 1/200.

* * * * *